```
  21 ─ DIGEST PHOSPHORS/ALUMINUM MIXTURE IN
        SODIUM HYDROXIDE SOLUTION UNTIL ALUMINUM
        IS DISSOLVED.
              ↓
  23 ─ WASH DIGESTED MIXTURE WITH WATER.
              ↓
  25 ─ MAKE AQUEOUS SLURRY CONTAINING PHOS-
        PHORS AND 12-22% BY WEIGHT NITRIC ACID.
              ↓
  27 ─ PERMIT NITRIC ACID TO OXIDIZE SULPHIDE
        PHOSPHOR PARTICLES AND CAUSE THEM TO
        RISE AND FLOAT ON SURFACE OF SLURRY.
              ↓
  29 ─ REMOVE FLOATED SULPHIDE PHOSPHOR
        PARTICLES FROM SLURRY BY DECANTING
        OR SKIMMING.
```

Fig. 2

United States Patent Office 3,740,342
Patented June 19, 1973

3,740,342
METHOD FOR SEPARATING CHEMICALLY-OXIDIZABLE PHOSPHOR PARTICLES FROM MIXTURES WITH ESSENTIALLY NONOXIDIZABLE PHOSPHOR PARTICLES
Richard Bibby Platt, Midland, and Bernard Beverly McCue, Christian Island, Simcoe, Ontario, Canada, assignors to RCA Corporation, New York, N.Y.
Filed July 26, 1971, Ser. No. 166,011
Int. Cl. C09k 1/12, 1/14, 1/20
U.S. Cl. 252—301.65                                10 Claims

ABSTRACT OF THE DISCLOSURE

To separate chemically-oxidizable phosphor particles, such as zinc sulfide and zinc-cadmium sulfide phosphor particles, from a mixture with essentially nonoxidizable phosphor particles such as yttrium oxysulfide phosphor particles, produce an aqueous slurry containing the mixture of particles and about 12 to 22 weight percent nitric acid. The nitric acid reacts with the oxidizable phosphor particles producing gas bubbles, which cause the oxidizable particles to rise and to float on the surface of the slurry. The floated particles are removed by decantation, skimming or other technique.

BACKGROUND OF THE INVENTION

This invention relates to a method for separating chemically-oxidizable phosphor particles from a mixture with essentially nonoxidizable phosphor particles. The invention is applied particularly to recovering red-emitting phosphor particles, which may be, for example, yttrium vanadate or europium-activated yttrium oxysulfide phosphor particles, that are mixed with blue-emitting and/or green-emitting zinc sulfide and/or zinc-cadmium sulfide phosphor particles.

At various stages during the manufacture of color television picture tubes, a portion of the tubes in process is found to be defective and an attempt is made to salvage various of the tube components. Also, subsequent to manufacture, some tubes are or become defective, and an attempt is made to salvage various of the tube components. When the luminescent viewing screens are removed from the faceplate panel during salvage operations, particles of the various phosphors become mixed with each other. If the removal of the screen occurs before the screen has been aluminized, the mixture will include also various organic binders, such as polyvinyl alcohol copolymers and polyacrylates. If the removal of the screen occurs after the screen has been aluminized, the mixture will include also particles of aluminum metal. The presently used red-emitting phosphors contain rare-earth elements and are much more expensive than the blue-emitting and green-emitting phosphors, which are usually activated zinc sulfides and zinc-cadmium sulfides. At least for economic reasons, it is desirable to recover the relatively expensive red-emitting phosphor particles in reusable form, even at the expense of losing the other phosphor particles in the process.

Previous methods for recovering the red-emitting phosphor particles from a mixture with zinc sulfide and zinc-cadmium sulfide phosphor particles depend either on the selective dissolution of the zinc and zinc-cadmium sulfide phosphor particles in dilute mineral acids, such as hydrochloric and nitric acids, or upon complex flotation methods usually involving expensive flotation media. The complete dissolution of the zinc sulfide and zinc-cadmium sulfide phosphor particles in mineral acids is not practical when the content of sulfide particles in the mixture is more than about 5 weight percent of the red-emitting phosphor particles. Also, the recovered phosphor particles are usually contaminated with dissolved zinc, which adversely affects the performance of the recovered phosphor particles. The previous flotation methods are cumbersome and time consuming, requiring several steps to separate effectively the phosphors one from the other.

SUMMARY OF THE INVENTION

The novel method comprises producing by mixing or other technique, an aqueous slurry containing the mixture of chemically-oxidizable and nonoxidizable phosphor particles and concentrated nitric acid, preferably between 12 and 22 weight percent of the slurry. When the concentrated nitric acid reacts with the oxidizable phosphor particles in the slurry, an oxidation reaction occurs whereby gas bubbles form on the particles causing them to rise in the slurry and to float on the surface of the slurry. The floated particles are removed by decantation, skimming or other technique, leaving the other nonoxidizable phosphor particles of the mixture in the slurry.

The novel method effectively removes the oxidizable phosphor particles from the mixture with other particles, while involving a minimum of dissolution of any of the nonoxidizable phosphor particles. The method is rapid, requiring less than 15 minutes for completion, even with large batches of phosphor mixture. The novel method may be carried out with inexpensive equipment, since substantially all of the oxidizable phosphor particles are floated, and the floated particles form a cohesive mat or raft, which is easily removed from the surface of the slurry.

The novel method may include, prior to the flotation step described above, the step of digesting the mixture of phosphor particles in a solution of an alkali hydroxide or other reagent which will dissolve any particles of aluminum metal that may be present. The novel method may also include the steps of digesting the mixture of the phosphor particles in dilute solution of hydrogen peroxide or other oxidant, and then baking the digested mixture in air at elevated temperature to remove any organic materials which are present. The digestion and baking steps leave the phosphor mixture in a particulate form that is conveniently dispersed in an aqueous slurry.

BRIEF DESCRIPTION OF THE DRAWINGS

FIG. 2 is a flow diagram for a procedure for practicing the novel method with a phosphors-and-aluminum mixture.

DETAILED DESCRIPTION OF THE PREFERRED EMBODIMENTS

Example 1

Figure 1:
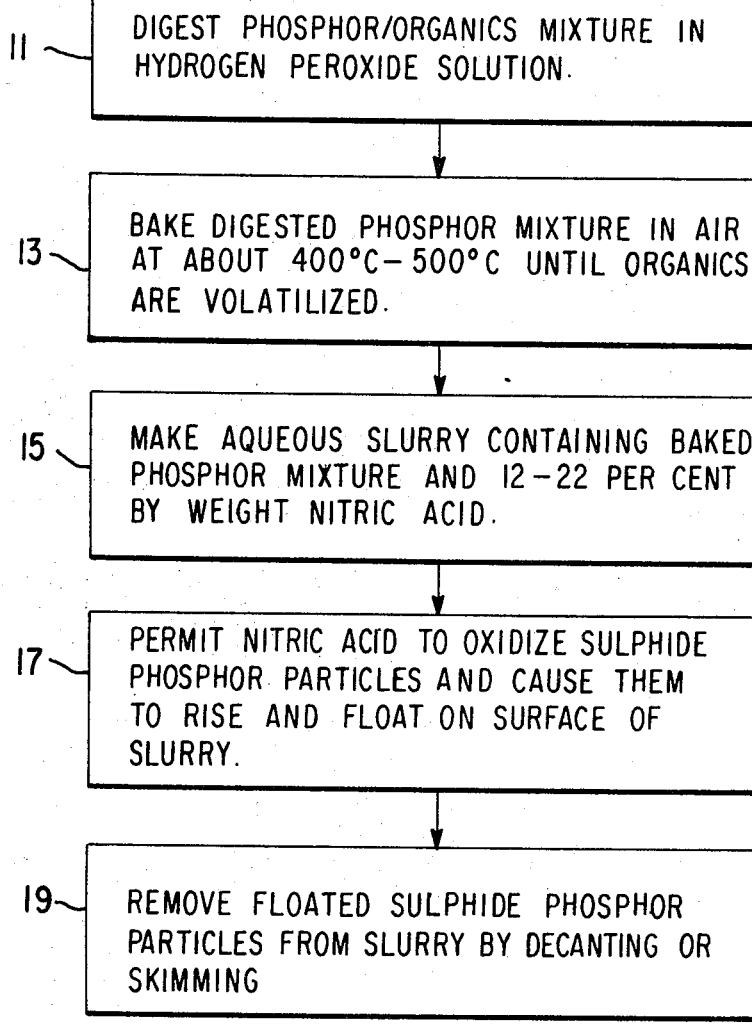
FIG. 1 is a flow diagram for a procedure for practicing the novel method with a phosphors-and-organics mixture.

Referring to FIG. 1, about fifty pounds of sludge consisting of mixed red-emitting, blue-emitting and green-emitting phosphors and organic binders together with caustic soda and aluminates produced from washing out screened television picture tube panels, are placed in an acid-resistant vessel, equipped with an overhead exhaust system. In this example, the sludge contains red-emitting europium-activated yttrium oxysulfide, green-emitting copper-and-aluminum activated zinc-cadmium sulfide and blue-emitting silver-activated zinc sulfide phosphors. The sludge, which derives from the caustic-soda wash tank in the screening room, is alkaline (pH about 8–10) and is treated with a hydrogen peroxide solution so that the concentration of peroxide in the slurry is about 5 to 10 percent by weight of the total slurry.

The digestion proceeds over two or three days during which time the organic materials are oxidized by the peroxide so that the original heavy slimy mass of phosphors and organic materials breaks down and the phosphor particles settle in the slurry. This stage is represented by the box 11 in FIG. 1. The peroxide digestion is followed by acidification of the slurry to a pH of about 2 and water washing to remove all the soluble products of the digestion process. The digested sludge, which is now essentially all mixed phosphor particles, is loaded into Pyrex glass trays and dried at about 200° C. The dried material is then broken up into lumps and baked at about 468° C. in air for about six hours, to ensure that all the residual organic material is volatilized by evaporation or oxidation, as indicated by box 13. The baked, mixed phosphor powder is then loaded into a 7-gallon mill, water is added to give a 50% solids slurry and the slurry is milled for about 60 minutes. This milling process breaks up small lumps and effectively disperses the particles so that they are readily available to the oxidizing action of the acid in the following stage of the novel method. The milled slurry is unloaded from the mill into the acid-resistant vessel previously used for the hydrogen-peroxide digestion step. Sufficient concentrated (52%) nitric acid is added to the slurry to give a nitric-acid concentration in the slurry of about 15 percent by weight as indicated by the box 15. The oxidation is more rapidly initiated if the slurry temperature at the time of adding the nitric acid is between about 50° C. and 55° C.

The nitric acid oxidizes the green-emitting and the blue-emitting sulfide phosphor particles, but not the red-emitting oxysulfide phosphor particles. The oxidation of the sulfide phosphor particles is vigorous, generating large volumes of nitrogen oxide gases, principally nitrogen dioxide $NO_2$. The principal reaction is believed to be in accordance with the following Equation 1:

$$ZnS + 8HNO_3 \rightarrow ZnSO_4 + 8NO_2 + 4H_2O \qquad (1)$$

The sulfide particles rise and float to the surface under the influence of the entrained gases, which appear as bubbles on and in the particles as indicated by box 17. The floating particles are removed from the slurry, leaving the red-emitting oxysulfide phosphor particles on the bottom of the vessel as indicated by box 19. At this time, the supernatant acid is decanted off and an equivalent volume of water is added. Sodium hydroxide solution (50% by weight NaOH) is added to the slurry in sufficient volume to neutralize the residual nitric acid and to prevent any further attack by the acid. This also promotes rapid settling of any suspended fine particles of red-emitting phosphor.

When the supernatant liquid is clear, it is siphoned off, the phosphor washed twice with water and then dried at about 232° C. Examination of recovered red-emitting phosphor shows it to be free of blue-emitting and green-emitting phosphor particles. The recovery is estimated to be about 90% of the red-emitting phosphor particles initially present in the sludge from the caustic-soda tank.

Example 2

Referring now to FIG. 2, about 10 pounds of a mixture of red-emitting phosphor particles, blue-emitting phosphor particles, green-emitting phosphor particles and aluminum-metal dust are added to an acid-resistant vessel equipped with an overhead exhaust system. This mixture derives from the luminescent screens removed from television tubes and faceplate panels which have been found to be defective in some way subsequent to the aluminizing of the screens. The baking step required for aluminizing removes all the organic components from the phosphors, leaving only the phosphor particles and the aluminum metal reflective coating, which is applied after the phosphor screen is laid down. The screen material may be removed from the panels with a vacuum cleaner, the action of which reduces the screen material to a dry powder, consisting of particles of the three phosphors and particles of aluminum metal. The aluminum metal is removed from the mixture by adding to the mixture a solution of approximately 5% by weight sodium hydroxide in water to provide a slurry consisting of about ten weight percent of the phosphors and aluminum and ninety percent of a 5 weight percent sodium-hydroxide solution.

The aluminum metal reacts readily with the sodium hydroxide to form sodium aluminate and liberating hydrogen, as indicated in the box 21. The reaction is believed to be according to the Equation 2:

$$2Al + 2NaOH + 2H_2O \rightarrow 2NaAlO_2 + 3H_2 \qquad (2)$$

The sodium aluminate $NaAlO_2$ is soluble in water and is removed by washing after all the hydrogen has been evolved and the mixed phosphors have settled to the bottom of the vessel as indicated by the box 23. The mixed phosphors are in a sufficiently well dispersed form that the oxidation reaction may proceed at once by the addition of about 15 to 20 weight percent aqueous solution of nitric acid, which reacts with the blue-emitting and green-emitting zinc-sulfide particles as described in Example 1.

The oxidation is again vigorous, liberating large volumes of nitrogen oxide gases and resulting in the flotation of the sulfide phosphor particles and leaving the red-emitting phosphor particles to settle on the bottom of the vessel, as indicated in boxes 25 and 27. The floating mat of sulfide particles is removed by decanting or skimming, and the excess nitric acid is decanted and an equal volume of water added. Sufficient quantities of 50% by weight sodium-hydroxide solution are added to neutralize the excess nitric acid.

When the supernatant liquid is clear, it is siphoned off, the settled red-emitting phosphor particles are washed twice with water and then dried at about 232° C. Examination of the recovered red-emitting phosphor shows it to be free of blue-emitting and green-emitting phosphor particles. The recovery is about 90% of the red-emitting phosphor particles initially present in the mixed phosphors, aluminum mixture.

Some general considerations and alternatives

The novel method may be practiced with many variations. The method is not restricted to metal-sulfide phosphors in mixtures with rare-earth activated phosphors. It is broadly applicable to all processes in which the separation of a class of oxidazable materials from another class of nonoxidizable materials is effected by taking advantage of the fact that, when the one class is oxidized with a suitable oxidizing agent in aqueous solution, the oxidation resulting in the formation of gas bubbles which cause the oxidized materials to float and hence to be removable by decanting, skimming or similar process from the other class of materials which are not caused to float. The second class of materials is thus generally in a stable, oxidized condition relative to the first class, which is relatively much less easily oxidized by the particular oxidizing agent being used. The novel method may be used to separate any phosphor particles which are oxidizable by a wet-chemical oxidation to form a gaseous reaction product from nonoxidizable phosphor particles.

Zinc-sulfide phosphors and zinc-cadmium sulfide phosphors are examples of phosphors which are readily oxidized by nitric acid to give soluble oxidation products, namely zinc sulfate and zinc-cadmium sulfate, and gaseous products, namely nitrogen oxides. Yttrium vanadate and yttrium oxysulfide activated with rare earth ions are examples of phosphors which are essentially resistant to oxidation by nitric acid. It is important that the oxidizing reaction should evolve gases which by their entrainment with the reacting particles cause these reacting particles to float and hence separate from the unreacting particles. When nitric acid is reacted with a metal sulfide, the nitric acid concentration should be sufficiently high that the reaction induced is oxidizing in nature to the sulfide particles present. In one form, the reaction follows the following chemical Equation 3:

$$RS + 8HNO_3 \rightarrow RSO_4 + 8NO_2 + 4H_2O \qquad (3)$$

in which RS is a metal sulfide, such as zinc sulfide, zinc-cadmium sulfide, cadmium sulfide, or magnesium sulfide. The metal sulfide reacts with nitric acid (present in large excess) to produce soluble metal sulfate $RSO_4$ and nitrogen-peroxide gas $NO_2$.

If the nitric acid is relatively dilute, e.g. 5 weight percent, the reaction will probably proceed according to the Equation 4:

$$RS + 2HNO_3 \rightarrow R(NO_3)_2 + H_2S \qquad (4)$$

In this reaction, zinc sulfide reacts with dilute nitric acid to form soluble zinc nitrate and hydrogen sulfide gas. The reaction represented by Equation 4 is slow and generates relatively little gas which is largely dissolved in solution. The reaction is ineffective in separating large quantities of zinc-sulfide phosphors from rare-earth phosphors. The reaction represented by the former Equation 3, is quite slow when the concentration of nitric acid is about ten percent; and when the concentration is twenty-five percent and above, the reaction is violent. Thus, the practical concentration of nitric acid for the novel method is between about 12 and 22 weight, and preferably between 15 and 20 percent, giving a rate of reaction which is sufficiently rapid without being excessively violent.

The nitrogen-oxide gases produced in the reaction form bubbles which becomes entrained within the sulfide particles and agglomerates, resulting in the agglomerated particles rising to the surface where they coalesce to form a floating mat or raft. This mat or raft is removed by decanting or skimming or some other appropriate technique. This results in the nonoxidized, red-emitting phosphor being left, free of zinc sulfide and zinc-cadmium-sulfide phosphor particles. The zinc and zinc-cadmium-sulfide phosphor particles are readily oxidized by nitric acid, whereas yttrium vanadate and yttrium-oxysulphide phosphor particles, which are typical of the red-emitting phosphors to be recovered, are not readily oxidized by nitric acid.

Insofar as we have determined, nitric acid is the only practical oxidizing agent for removing metal-sulfide phosphor particles because it readily oxidizes the sulfide particles to form gases, but is essentially nonreactive towards the red-emitting phosphor particles. Also, the non-gaseous products of the oxidation of the reactive particles with nitric acid are soluble in water so that they may be removed easily by washing. The production of insoluble materials by the oxidation may result in a contamination of the unreactive particles by such insoluble byproducts.

An advantage of the novel method is that it combines some useful features of both dissolution and flotation procedures. The separation of the sulfide phosphors is effected by treating the phosphor mixtures with 12 to 22 percent-by-weight nitric acid, which causes an immediate oxidation of the surface of the sulfide phosphor particles. The zinc sulfate produced is soluble and hence dissolves in the aqueous slurry. The nitrogen oxide gases become entrained in the interstices of the particles and particulate agglomerates, providing these particles and agglomerates with sufficient buoyancy that they float to the surface. This has the effect of both separating the reactive oxidizable phosphor particles from the nonreactive nonoxidizable phosphor particles, and of removing the reactive particles from the oxidizing action of the acid so that the reaction slows and finally ceases. In the examples, the method separates the blue-emitting and green-emitting sulfide phosphor particles, while reducing the dissolution of these particles to a minimum because of the rapidity of the reaction. The floated zinc-sulfide residues form a firm cohesive mat or raft on the surface. This cohesive property enables the residues to be removed by skimming them from the surface, leaving the settled red-emitting phosphor particles free of green-emitting and blue-emitting phosphor particles.

Figure 3:
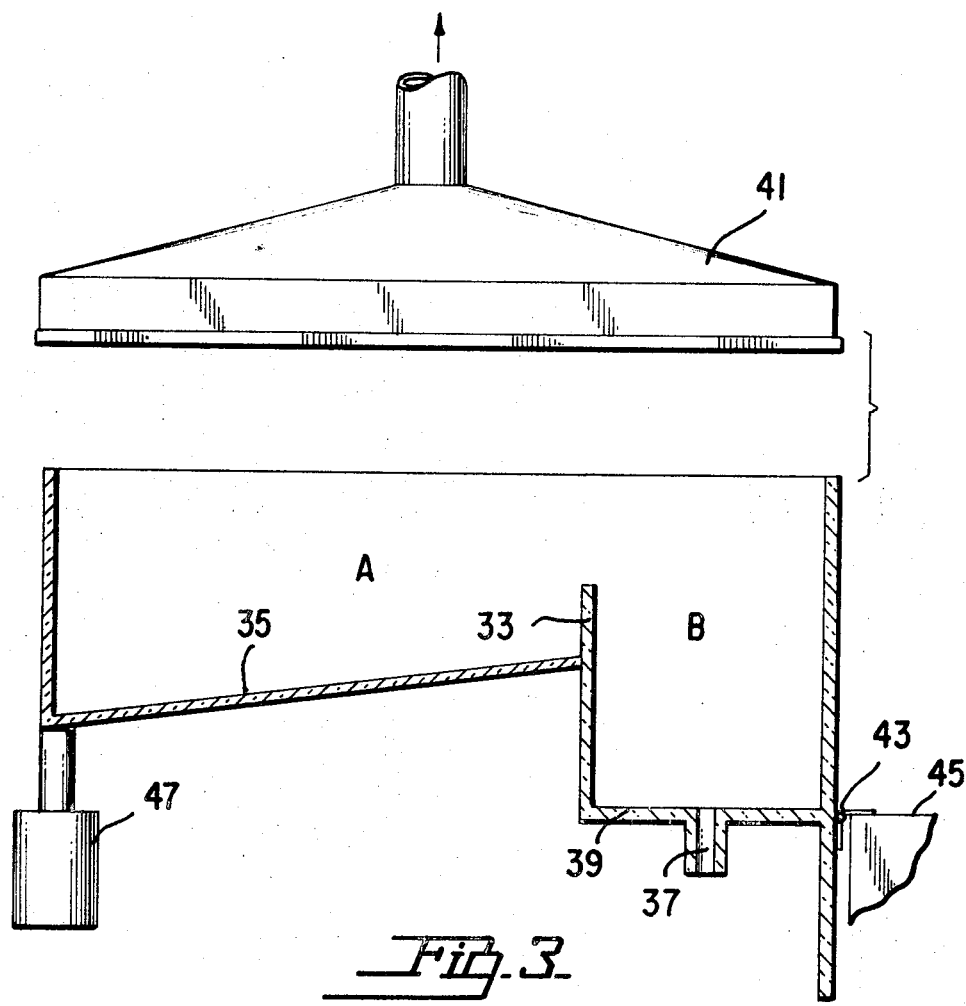
FIG. 3 is a sectional elevational view of an apparatus that may be used for practicing the novel method.

One vessel which may be used for carrying out the various steps of the novel method, including the digestion, oxidation and washing procedures, is shown in FIG. 3. It is comprised of a rectangular container 31 generally about 54 inches long, 36 inches wide and 24 inches deep. It is divided into two compartments A and B by a weir 33. The compartments A and B are about 36 inches by 36 inches and 18 inches by 36 inches respectively. The larger compartment A has a sloping floor 35 to facilitate the collection and subsequent removal of settled phosphor particles. The smaller compartment B has a drain 37 in its floor 39. The entire vessel is preferably covered by an exhaust hood 41. The vessel is supported on one side by a hinge 43 on a fixed support 45 at the base of compartment B and, on its other side, by a hydraulic jack 47 fitted under the base of compartment A. Raising the piston of the hydraulic jack 47 causes the vessel to pivot about the hinge 43. This enables the raft of coalesced particles to be floated over the weir 33 into the compartment B without significantly disturbing the settled phosphor particles on the floor 35 of compartment A. After the floating material is removed, the liquid is siphoned from compartment A into compartment B and sent to drain. The settled phosphor particles are then washed and removed manually for drying.

The novel method may include, prior to the oxidation and flotation steps described above, steps for removing aluminum-metal particles, organic materials, or both. Salvageable mixtures of phosphors arrive in two principal forms. The mixture may be in the form of a wet sludge produced by removing luminescent screens that have not yet been metallized. Usually the sludge consists of mixed phosphors, organic binders such as polyvinyl alcohol polymers and polyacrylates, and water. The mixture may be in the form of a dry powder produced by physically removing luminescent screens that have been aluminized. Usually, the dry powder consists of the mixed phosphors and aluminum dust derived from the screens of salvaged television tubes and faceplates.

A wet sludge mixture should be treated first to solubilize the organic materials. This may be done by digesting the sludge in a suitable vessel with a five-to-ten-weight-percent solution of hydrogen peroxide. Hydrogen peroxide is a very convenient material for this purpose, containing approximately fifty-percent-by-weight available oxygen and introducing no contaminating ions. However, it is by no means the only possible oxidant for the purpose of digesting the organic residues in the sludge. Examples of other suitable oxidants are sodium peroxide, sodium hypochlorite, and ammonium persulfate, which may be used as dilute aqueous solutions thereof.

These digestion and baking steps remove all residual organic material and leave the phosphor mixture in a particulate form which is conveniently dispersed in an aqueous slurry.

A dry powder mixture, containing the three mixed phosphors and aluminum powder and shreds, should be treated first to remove the aluminum. This may be done by digesting the powder in a five-to-ten-weight-percent solution of alkali hydroxide, such as potassium hydroxide or sodium-hydroxide. The alkali hydroxide reacts readily with aluminum to produce alkali aluminate and hydrogen gas. This digestion may be done in a vessel which is chemically resistant and is suitably vented to remove evolved gases. The digestion of the aluminum may be performed also with dilute mineral acids such as hydrochloric or nitric acids. This is not recommended because the dilute acids dissolve the phosphors with the evolution of hydrogen sulfide.

We claim:

1. A method for separating oxidizable metal sulfide phosphor particles from a mixture with relatively non-oxidizable phosphor particles comprising (a) producing an aqueous slurry containing said mixture of phosphor particles and about 12-to-22-weight-percent nitric acid,
(b) permitting said nitric acid to react with said oxidizable phosphor particles whereby said oxidizable phosphor particles rise and float on the surface of said slurry,
(c) and then removing said floated phosphor particles from said slurry.

2. The method defined in claim 1 wherein said oxidizable phosphor particles are selected from the group consisting of zinc sulfide phosphor particles and zinc-cadmium sulfide phosphor particles.

3. The method defined in claim 2 wherein said nonoxidizable phosphor particles consist essentially of yttrium oxysulfide phosphor particles.

4. A method for separating zinc sulfide phosphor particles and zinc cadmium sulfide phosphor particles from a mixture thereof with relatively nonoxidizable phosphor particles comprising
(a) producing a slurry of said mixture in an aqueous medium,
(b) adding sufficient nitric acid to said slurry to provide a concentration of about 12-to-22 weight percent nitric acid in said slurry,
(c) permitting said nitric acid to react with said sulfide phosphor particles whereby said sulfide phosphor particles float on the surface of said slurry and said nonoxidizable phosphor particles remain submerged in said slurry,
(d) and then removing said floated sulfide phosphor particles from said slurry while retaining said submerged nonoxidizable phosphor particles in said slurry.

5. The method defined in claim 4 wherein said mixture comprises also organic matter, and including, prior to step (a), the steps of digesting said mixture in a dilute aqueous solution of an oxidant, washing said digested mixture with water, and then baking said washed mixture in air at about 400 to 500° C. until substantially all of the organic matter present in the mixture is removed.

6. The method defined in claim 5 wherein said dilute aqueous solution of an oxidant is a five-to-ten-weight-percent aqueous solution of hydrogen peroxide.

7. The method defined in claim 4 wherein said mixture comprises also particles of aluminum metal, and including the step, prior to step (a), of digesting said mixture in a dilute aqueous solution of an alkali hydroxide until said particles of aluminum metal are dissolved.

8. The method defined in claim 7 wherein said solution of alkali hydroxide is a five-to-ten-weight-percent aqueous solution of sodium hydroxide.

9. The method defined in claim 4 wherein said nonoxidizable phosphor particles are yttrium oxysulfide phosphor particles.

10. The method defined in claim 4 including the subsequent steps of
(g) neutralizing the acidity of said slurry with a solution of an alkali hydroxide,
(h) and then washing said retained phosphor particles with water.

References Cited
UNITED STATES PATENTS

| | | | |
|---|---|---|---|
| 3,348,924 | 10/1967 | Levine et al. | 252—301.4 R |
| 3,577,351 | 5/1971 | Dodds | 252—301.4 R |
| 3,506,585 | 4/1970 | Otsuka et al. | 252—301.4 R |
| 3,523,904 | 8/1970 | Single | 252—301.4 R X |
| 3,649,216 | 3/1972 | Hammond et al. | 252—301.6 S X |

EDWARD J. MEROS, Primary Examiner

J. COOPER, Assistant Examiner

U.S. Cl. X.R.

252—301.4 S, 301.4 R; 423—21